Patented Feb. 12, 1935

1,991,325

UNITED STATES PATENT OFFICE 1,991,325

CALCIUM CHLORATE-CALCIUM CHLORIDE MIXED PRODUCT

Sheldon B. Heath, Midland, Mich., assignor to The Dow Chemical Company, Midland, Mich., a corporation of Michigan No Drawing. Application June 17, 1931,
Serial No. 545,152

4 Claims. (Cl. 167—45)

The present application has reference to a new and improved product consisting of a mixture of calcium chlorate and calcium chloride in flake or similar subdivided form, such product being particularly adapted for use as an herbicide and the like.

It is well known that chlorates are effective agents for destroying vegetation, being used particularly as weed killers and the like, usually by spraying a solution of the chloride upon the vegetation which it is desired to eradicate. One danger connected with such use, however, has been found to exist in the extreme inflammability of the dead and dried up foliage which is more or less impregnated with the chlorate. To avoid this danger it has been proposed to employ a hygroscopic salt in combination with the chlorate, so that the dead vegetation may be kept moist by the absorption of water from the air by the hygroscopic salt and hence less liable to take fire. Calcium chlorate, for example, is effective and economical as an herbicide, and a mixture of calcium chlorate and calcium chloride has been found well adapted to furnish the required combination of an herbicidal agent and a hygroscopic salt. It is desirable to provide such mixed product in a free-flowing, subdivided form which is economical to manufacture, convenient for packaging, storing or dispensing and not subject to deterioration due to caking in the package. The invention, then, consists in the new product, together with the method for preparing the same, hereinafter fully described and particularly pointed out in the claims.

In my prior application Serial No. 424,493, filed January 30, 1930 now Patent No. 1,887,809, I have disclosed a method of crystallizing calcium chlorate in the form of the dihydrated salt, $Ca(ClO_3)_2.2H_2O$, from solutions thereof containing also calcium chloride. The raw crystals thus obtained constitute a moist, soggy, deliquescent mass which, while it does not harden to a solid cake, is not at all free-flowing and liquefies readily if moderately heated. These crystals cannot be surface dried by any ordinary method in order to render them free-flowing since upon heating to a temperature between about 60° and 67° C. they melt in their water of crystallization without drying. The molten dihydrate may be further evaporated and the anhydrous chlorate crystallized at a temperature above 67° C., but such procedure involves tedious manipulation and necessitates disposing of the mother liquors. It has not been found practicable to flake the salt in the well known manner by solidifying a layer of the molten salt on a cooled moving metallic surface and scraping it off, because the flakes are soft and moist and tend to pack together in the same manner as the crystals.

I have found, however, that by adding a limited amount of calcium chloride to the moist calcium chlorate crystals and melting or dissolving the mass to form a homogeneous mixture, the latter upon further evaporation may be readily flaked in the form of strong, hard flakes which are free-flowing and non-caking, and are especially well adapted for packaging and storing. A further advantage is that the flaked mixed product so prepared contains approximately the optimum proportions of chlorate and chloride which have been found suitable for use as an herbicidal composition.

The raw crystals of calcium chlorate as obtained by the process of the aforesaid Patent No. 1,887,809 by centrifuging but without washing contain a small amount of calcium chloride due to the adhering mother liquor. An average analysis of such crystals is;

| | Per cent |
|---|---|
| $Ca(ClO_3)_2$ | 79 |
| $CaCl_2$ | 6 |
| $H_2O$ | 15 |

Crystals of such composition, if melted up, evaporated and flaked, do not produce a hard flake. However, if sufficient calcium chloride is added thereto to make a mixed product having a chlorate-chloride ratio between $$\frac{65}{35}$$

and $$\frac{85}{15}$$

by weight of the anhydrous salts, and the molten salt mixture is evaporated until a slurry of crystals and mother liquor is formed containing from 6 to 12 per cent of water, such slurry may be flaked to produce a strong, hard flake which is free-flowing and will withstand mechanical handling without materially disintegrating or pulverizing.

As an example of the preparation of a mixed product of the character in question, a solution is provided containing approximately 77 parts $Ca(ClO_3)_2$ to 23 parts $CaCl_2$ by weight, and evaporated until a sufficient amount of crystals is formed to produce a hot slurry of such consistency as may still be handled by a centrifugal pump. The evaporation temperature should not be allowed greatly to exceed 160° C., inasmuch as above such temperature decomposition of chlorate may occur, accompanied by evolution of oxygen and chlorine. In order to enable the evaporation to proceed far enough at a temperature below 160° C. to produce a suitable crystal slurry, the evaporation is carried out, or at least finished, under reduced pressure, e. g. at approximately 10 to 12 inches of mercury absolute pressure. Under such regulated vacuum, accordingly, the evaporation is continued until the temperature of the liquor rises to about 160° C. The hot crystal slurry so formed is then transferred to the trough or pan of a flaking apparatus wherein it is contacted with the surface of an internally cooled revolving metallic drum or cylinder. A thin film of the salt mixture is solidified on the drum surface, and then scraped therefrom to form flakes, in the well known manner. The solidified film is hard and brittle and is detached easily from the surface by the scraper, forming strong flakes which are free-flowing and non-caking. The flakes scraped from the drum are preferably aircooled to about room temperature and may then be packaged, exhibiting in storage thereafter no tendency to cake in a tight package which is closed against the entrance of air, even when exposed to temperatures as high as 100° C. The product so prepared has an analysis approximately as follows;

|  | Per cent |
|---|---|
| $Ca(ClO_3)_2$ | 70 |
| $CaCl_2$ | 21 |
| $H_2O$ | 9 |

Naturally the analysis may be varied within the limits already stated, depending upon the actual proportions of calcium chlorate and calcium chloride in the original solution employed.

The crystals produced in the hot liquor during evaporation are probably of calcium chloride monohydrate, $CaCl_2.H_2O$. An advantage of continuing evaporation until a crystal slurry is produced, is that such slurry sodifies more quickly than a clear hot solution of the two salts, and does not adhere tenaciously to the surface of the flaker drum, so that it can be more easily and rapidly flaked. If desired, the flakes may be surface dried by contacting with a hot gaseous current, in accordance with the general method disclosed in United States Patent No. 1,527,121.

While particular advantages are realized in preparing a flaked mixed product according to the procedure hereinbefore described, at least some of the advantages are retained when, instead of flaking, the crystal slurry is chilled and solidified mechanically by means adapted to produce a granulated product according to methods familiar to those versed in the art.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making a calcium chlorate-calcium chloride mixed product which comprises preparing a solution of the two salts containing from 65 to 85 parts of such chlorate to from 35 to 15 parts of such chloride, evaporating the same to a temperature not materially exceeding 160° C. to produce a slurry of crystals and mother liquor thereof containing from about 6 to about 12 per cent of water, chilling and mechanically sub-dividing such slurry to solidify the same in the form of small particles.

2. The method of making a calcium chlorate-calcium chloride mixed product which comprises preparing a solution of the two salts containing from 65 to 85 parts of such chlorate to from 35 to 15 parts of such chloride, evaporating the same to a temperature not materially exceeding 160° C. to produce a slurry of crystals and mother liquor thereof containing from about 6 to about 12 per cent of water and flaking such slurry.

3. A composition of matter comprising partially hydrated solid flake or granular particles composed of calcium chlorate and calcium chloride in the ratio of the former to the latter between $$\frac{85}{15}$$

and $$\frac{65}{35}$$

by weight, and containing from 6 to 12 per cent of combined water, such particles being hard, free-flowing, and not subject to caking in storage.

4. A composition of matter comprising partially hydrated solid flake or granular particles composed of calcium chlorate and calcium chloride in the ratio of the former to the latter of approximately $$\frac{80}{20}$$

by weight, and containing from 6 to 12 per cent of combined water, such particles being hard, free-flowing, and not subject to caking in storage.

SHELDON B. HEATH.